US011882587B2

(12) United States Patent
Veinpel et al.

(10) Patent No.: US 11,882,587 B2
(45) Date of Patent: *Jan. 23, 2024

(54) SYSTEMS AND METHODS FOR DYNAMIC EVENT-BASED RESOURCE ALLOCATION IN A RADIO ACCESS NETWORK

(71) Applicant: Verizon Patent and Licensing Inc., Basking Ridge, NJ (US)

(72) Inventors: Gregg L. Veinpel, Kennewick, WA (US); Michael J. Pepe, Smithtown, NY (US); Walter S. Schaefer, Reno, NV (US); Joseph James Ahrens, Austin, TX (US); Edward Luna, Sussex, NJ (US); Irv Hilf, Camarillo, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/062,066

(22) Filed: Dec. 6, 2022

(65) Prior Publication Data

US 2023/0099244 A1     Mar. 30, 2023

Related U.S. Application Data

(63) Continuation of application No. 17/162,700, filed on Jan. 29, 2021, now Pat. No. 11,546,920.

(51) Int. Cl.
*H04W 72/51* (2023.01)
*H04W 72/543* (2023.01)

(52) U.S. Cl.
CPC ........ *H04W 72/543* (2023.01); *H04W 72/51* (2023.01)

(58) Field of Classification Search
CPC .......................... H04W 72/543; H04W 72/51
See application file for complete search history.

(56) References Cited

U.S. PATENT DOCUMENTS

| | | | |
|---|---|---|---|
| 7,826,415 | B2 | 11/2010 | Oh et al. |
| 9,787,557 | B2 | 10/2017 | Leblanc et al. |
| 10,863,525 | B1 | 12/2020 | Vivanco et al. |
| 11,224,034 | B2 | 1/2022 | Nam et al. |
| 2001/0040895 | A1 | 11/2001 | Templin |
| 2002/0012320 | A1 | 1/2002 | Ogier et al. |
| 2003/0202479 | A1 | 10/2003 | Huang et al. |
| 2008/0062936 | A1 | 3/2008 | He et al. |
| 2010/0029282 | A1 | 2/2010 | Stamoulis et al. |
| 2011/0072475 | A1* | 3/2011 | McKiel, Jr. ........ H04N 7/17318 725/100 |
| 2012/0155282 | A1 | 6/2012 | Dorenbosch |
| 2012/0170502 | A1 | 7/2012 | Korus et al. |

(Continued)

*Primary Examiner* — Hassan A Phillips
*Assistant Examiner* — Prenell P Jones

(57) ABSTRACT

A system described herein may provide a technique for identifying User Equipment ("UEs") associated with relevant users, such as "personal" UEs associated with first responders, based on the occurrence of an event, notifying the UEs of the event, and modifying radio access network ("RAN") parameters such that the identified UEs are provided with priority access. Further, such modifications may be temporary (e.g., reverted after the event has occurred). In this manner, personal UEs associated with relevant users may be dynamically provided priority access in situations where such access may be beneficial, without needing to permanently provide the priority access to such UEs.

20 Claims, 11 Drawing Sheets

(56) References Cited

U.S. PATENT DOCUMENTS

| | | |
|---|---|---|
| 2013/0160058 A1 | 6/2013 | Albal et al. |
| 2015/0289149 A1* | 10/2015 | Ouyang ................ H04W 16/18 |
| | | 370/252 |
| 2017/0188260 A1 | 6/2017 | Zhou et al. |
| 2018/0101401 A1 | 4/2018 | Duca et al. |
| 2018/0338346 A1 | 11/2018 | Routt |
| 2019/0020987 A1 | 1/2019 | Khoryaev et al. |
| 2020/0329523 A1* | 10/2020 | Yi ......................... H04W 72/51 |
| 2020/0393167 A1 | 12/2020 | Wu |
| 2021/0067220 A1* | 3/2021 | Abdelghaffar ....... H04B 7/0486 |
| 2021/0329423 A1 | 10/2021 | Heo et al. |
| 2021/0329466 A1 | 10/2021 | Khasnabish et al. |
| 2022/0038935 A1 | 2/2022 | Xiong et al. |
| 2022/0046724 A1 | 2/2022 | Maso et al. |
| 2022/0078806 A1 | 3/2022 | Sevindik et al. |

* cited by examiner

SYSTEMS AND METHODS FOR DYNAMIC EVENT-BASED RESOURCE ALLOCATION IN A RADIO ACCESS NETWORK

CROSS-REFERENCE TO RELATED APPLICATION

This Application is a Continuation of U.S. patent application Ser. No. 17/162,700, filed on Jan. 20, 2021, titled "SYSTEMS AND METHODS FOR DYNAMIC EVENT-BASED RESOURCE ALLOCATION IN A RADIO ACCESS NETWORK," the contents of which are herein incorporated by reference in their entirety.

BACKGROUND

Radio access networks ("RANs"), such as Fifth Generation ("5G") networks, Long-Term Evolution ("LTE") networks, or other types of wireless networks, may have finite radio frequency ("RF") resources available via which wireless communications may be sent and/or received to and/or from User Equipment ("UEs"), such as mobile telephones, Internet of Things ("IoT") devices, and/or other types of devices. Some RANs may dedicate sets of RF resources in the time and/or frequency domains (e.g., Physical Resource Blocks ("PRBs")) to certain UEs or groups of UEs (e.g., UEs associated with first responder agencies, UEs associated with universities, etc.), and/or for certain types of traffic or applications (e.g., voice traffic, streaming traffic, etc.).

DETAILED DESCRIPTION OF EXAMPLE EMBODIMENTS

Figure 1:
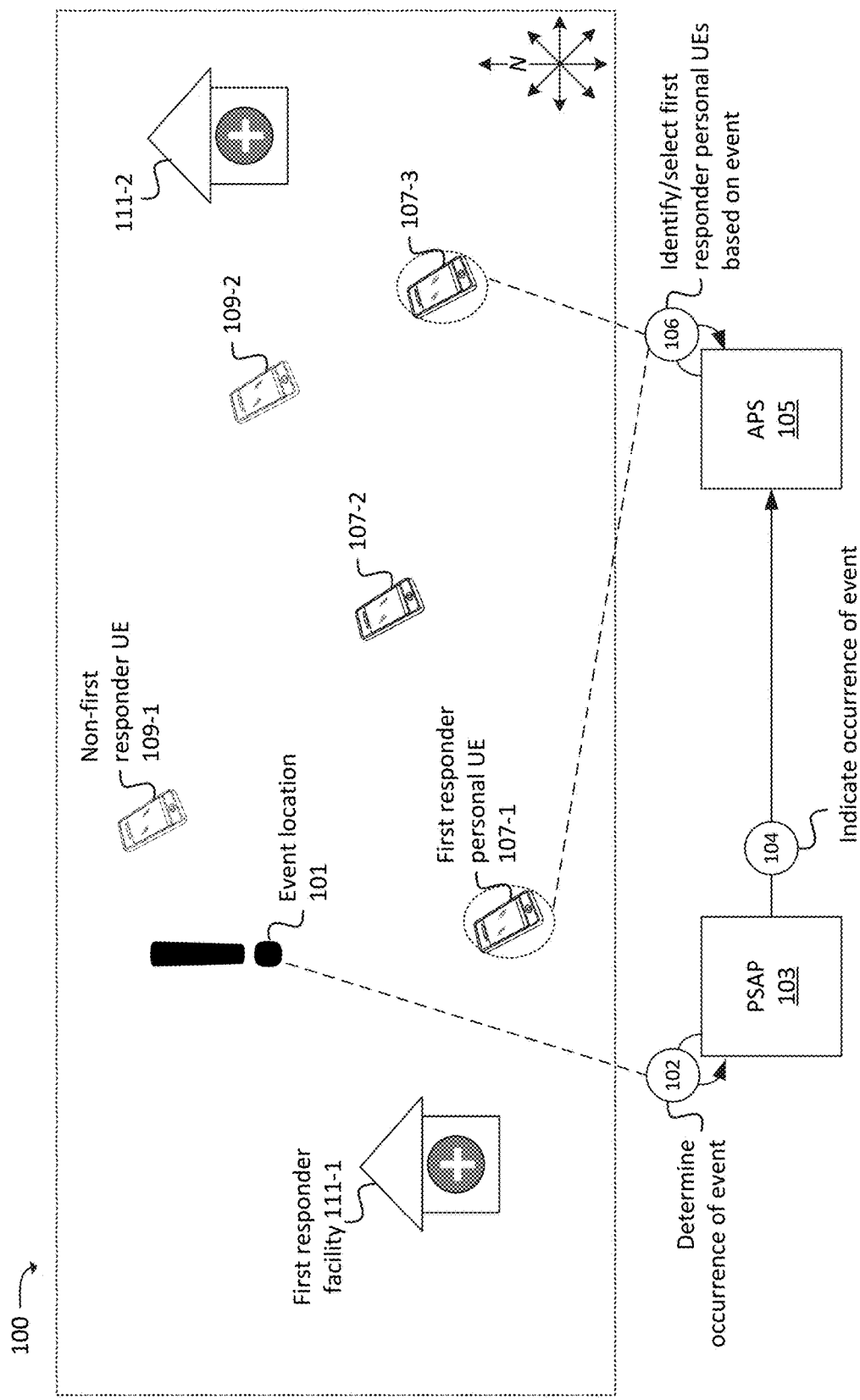
FIG. 1 illustrates an example selection of a set of UEs based on the detection of an event, in accordance with some embodiments.

The following detailed description refers to the accompanying drawings. The same reference numbers in different drawings may identify the same or similar elements.

Some RANs may dedicate sets of RF resources in the time and/or frequency domains (e.g., PRBs) to certain UEs or groups of UEs (e.g., UEs associated with first responder agencies, universities, etc.), and/or for certain types of traffic or applications (e.g., voice traffic, streaming traffic, etc.). For example, a particular RAN may include a base stations that provide wireless service to UEs within a coverage area of the base station, and the base station may allocate a discrete set of resources (e.g., PRBs, processing resources, and/or other resources) for UEs associated with a first responder agency. Such UEs may include, for example, communications equipment installed in an emergency vehicle, communications equipment installed in a fire or police station, mobile phones issued to personnel associated with a given agency, etc. Providing discrete resources to such UEs may ensure that such UEs are able to receive wireless service (e.g., send and/or receive traffic via the RAN) even in situations where the base station is otherwise congested (e.g., other sets of resources are consumed by other UEs, such as UEs not associated with a first responder agency).

Situations may arise where a user associated with a particular group (e.g., a first responder agency) may need to be notified about an event that may be of particular relevance or interest to the user, while the user is not in the vicinity of a dedicated UE associated with the group. For example, an off-duty firefighter may not have access to communications equipment installed in a firehouse or a fire truck, but may be in possession of one or more "personal" UEs that are not necessarily provided by or otherwise associated with the first responder agency, such as the firefighter's personal mobile telephone, tablet computer, vehicle infotainment system, etc. Since such UEs are "personal" UEs, they may not be registered with the first responder agency and thus the RAN may not provide service using the dedicated resources normally provided to UEs associated with the first responder agency. In such situations, the personal UEs of the firefighter may not receive prioritized wireless service (e.g., that would otherwise be available via the discrete set of resources provided to the UEs of the first responder agency), and may encounter difficulty in sending and/or receiving traffic (e.g., placing a voice call) during particular situations, such as during an emergency.

As described herein, an Alert and Priority System ("APS") of some embodiments may identify UEs associated with relevant users (e.g., "personal" UEs associated with first responders) based on the occurrence of an event and modify RAN parameters such that the identified UEs are provided with priority access. The relevant users may be notified of the event, either through one of their associated UEs or in another manner. In this manner, personal UEs associated with relevant users may be dynamically provided priority access in situations where such access may be beneficial, without needing to permanently provide the priority access to such UEs.

As shown in FIG. 1, a geographical region 100 may include event location 101, which may be a geographical location or area within geographical region 100 that is associated with an event. The event may be an emergency event, such as a fire, a robbery, a medical emergency, and/or some other type of event. Public Safety Answering Point ("PSAP") 103 may determine (at 102) an occurrence of the event at event location 101. For example, PSAP 103 may receive an emergency call, may receive an automated alert from an alerting device, and/or may otherwise determine the occurrence of the event. PSAP 103 may receive an indication of, and/or may otherwise determine, location information associated with event location 101, such as a set of latitude and longitude coordinates, Global Positioning System ("GPS") coordinates, or other suitable location information. PSAP 103 may also receive an indication of, and/or may otherwise determine, a type of event (e.g., fire, robbery, medical emergency, etc.).

PSAP 103 may indicate (at 104) the occurrence of the event to APS 105. For example, PSAP 103 and APS 105 may communicate via an application programming interface ("API") or some other suitable communication pathway, such that APS 105 receives (at 104) such indications automatically, without the need for an operator associated with PSAP 103 to manually notify APS 105. The indication (received at 104) may indicate event location 101, a type of event, and/or other information regarding the determined event.

As further shown in FIG. 1, several UEs may be present within geographical region 100 (e.g., at the time the event is detected, and/or within a threshold amount of time after the event has been detected). For example, UEs 107-1, 107-2, and 107-3 (herein sometimes referred to individually as "UE 107" or collectively as "UEs 107") may be personal UEs associated with one or more first responders, and UEs 109-1 and 109-2 may be UEs that are not associated with first responders.

In accordance with embodiments described herein, APS 105 may identify and/or select (at 106) particular UEs 107 based on the detection of the event. Example criteria based on which such UEs 107 may be selected are described below with respect to FIG. 2. Briefly, APS 105 may select particular UEs 107 based on proximity to event location 101, and/or based on an association with a particular first responder facility 111 that is determined to be relevant to the event. In this example, APS 105 may select (at 106) UEs 107-1 and 107-3, but not UE 107-2. Further, UEs 109-1 and 109-2 may not be selected, by virtue of not being associated with a particular group (e.g., first responders, in this example). As further described below, selected UEs 107 may be "elevated" in priority, such that one or more RANs via which the selected UEs 107 are connected provide prioritized or otherwise modified service to UEs 107 in certain situations (e.g., based on the detection of an event).

As noted above, FIG. 2 illustrates the example selection of particular UEs 107 (e.g., the selection of UEs 107-1 and 107-3 from the group of UEs that includes UEs 107-1, 107-2, and 107-3). For example, APS 105 may select particular UEs 107 based on attributes of such UEs 107 and/or users associated with UEs 107. As shown, APS 105 may receive (at 202) UE information from user information repository 205. In some embodiments, user information repository 205 may be, may include, and/or may be communicatively coupled a Home Subscriber Server ("HSS") associated with a wireless network, a Unified Data Management function ("UDM") associated with a wireless network, and/or some other device or system of a wireless network that performs operations related to the maintaining and/or providing of UE and/or user information. In some embodiments, APS 105 may receive such UE information from a device or system of a wireless network that exposes information or services associated with the wireless network, such as a Service Capability Exposure Function ("SCEF"), a Network Exposure Function ("NEF"), or other suitable device or system.

Figure 2:
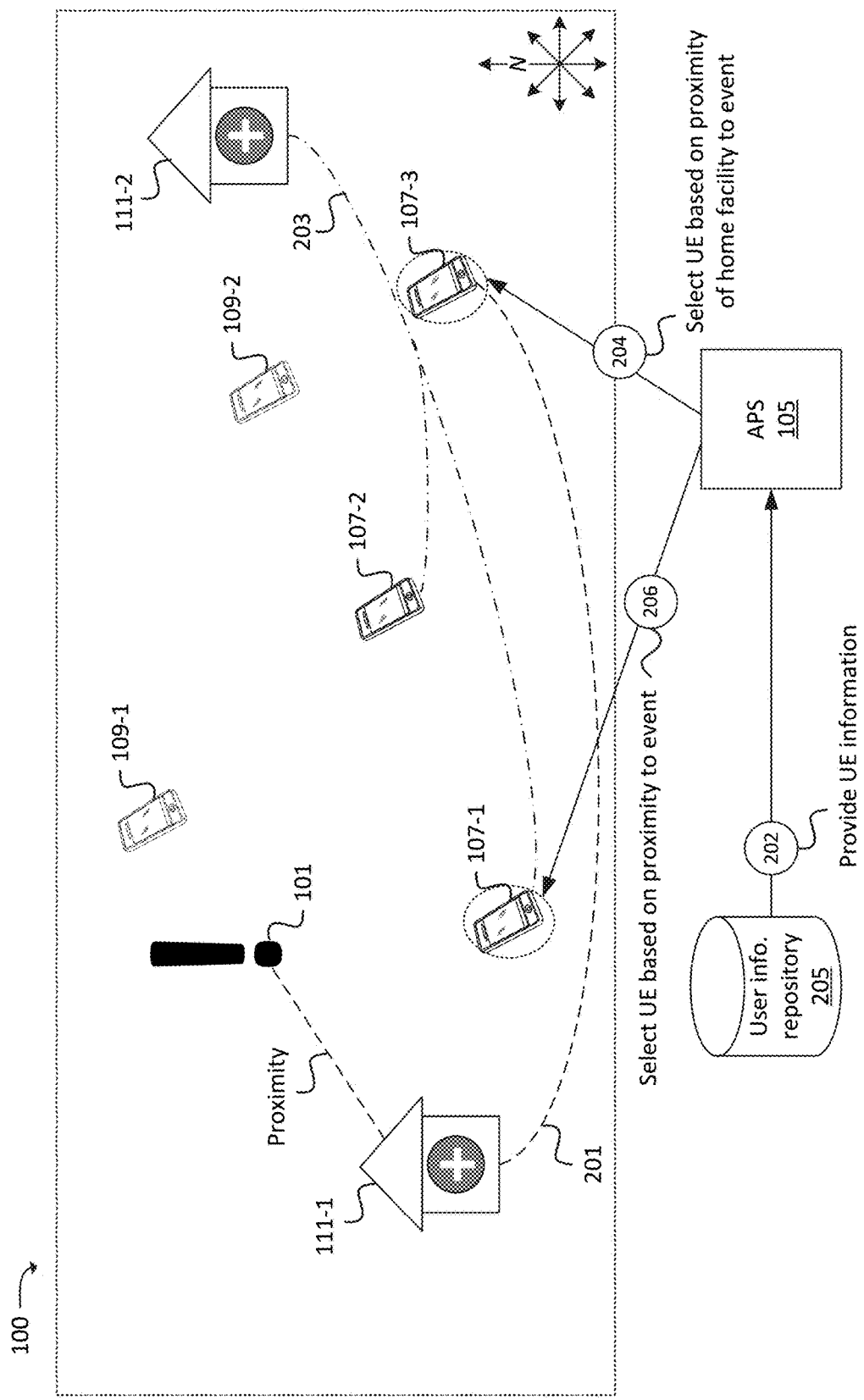
FIG. 2 illustrates example criteria based on which particular UEs may be selected based on the detection of an event, in accordance with some embodiments.

The information (received at 202) may include information indicating particular users associated with respective UEs 107, particular facilities 111 associated with such users and/or UEs 107, location information associated with UEs 107, and/or other UE information. As shown, particular UEs 107 may be associated with particular facilities 111. For example, APS 105 may determine (e.g., based on the received UE information) an association 201 between facility 111-1 and UE 107-3, and may also determine an association 203 between facility 111-2 and UEs 107-1 and 107-2. Associations 201 and 203 may indicate, for example, that users associated with respective facilities 111 are associated with respective UEs 107. For example, UE 107-3 may be the personal UE of a user (e.g., a first responder) who has facility 111-1 as a "home" facility (e.g., a facility at which the user works, a facility that notifies the user regarding events, and/or a facility with which the user is otherwise associated). Similarly, UE 107-1 may be the personal UE of a particular user who has facility 111-2 as a "home" facility, and UE 107-2 may be the personal UE of a user (e.g., the particular user associated with UE 107-1 and/or another user) who has facility 111-2 as a "home" facility. In the example of FIG. 2, associations 201 and 203 are associations of respective UEs 107 to one respective facility 111. In some embodiments, a given UE 107 may be associated with multiple facilities 111.

As shown in FIG. 2, in this example, APS 105 may select (at 204) UE 107-3 based on a determination that facility 111-1 is relevant with respect to the event (e.g., based on proximity of facility 111-1 to event location 101, equipment and/or personnel associated with facility 111-1 being relevant to a type of event such as fire, robbery, etc., and/or based on other factors), and further based on a determination that association 201 exists between facility 111-1 and UE 107-3. APS 105 may determine that facility 111-1 is "proximate" to event location 101 inasmuch as facility 111-1 is within a threshold proximity of event location 101, that facility 111-1 is a closest facility 111 to event location 101, and/or based on some other suitable criteria. As further shown, APS 105 may select (at 206) UE 107-1 based on a proximity of UE 107-1 to event location 101. For example, although the "home" facility of UE 107-1 is facility 111-2 in this example (e.g., as indicated by association 203), APS 105 may select UE 107-1 based on a determination that UE 107-1 is proximate to event location 101 (e.g., within a threshold proximity of event location 101, a determination that UE 107-1 is a closest UE 107 to event location 101, a determination that UE 107-1 is one of a set of closest UEs 107 to event location 101, and/or based on some other criteria). Further, in this example, APS 105 may refrain from selecting UE 107-2, as UE 107-2 is not proximate to event location 101 (e.g., within a threshold proximity of event location 101, is not a closest UE 107 to event location 101, etc.) and further because UE 107-2 is not associated with a facility 111 that is proximate to event location 101 (e.g., facility 111-1, in this example).

Figure 3:
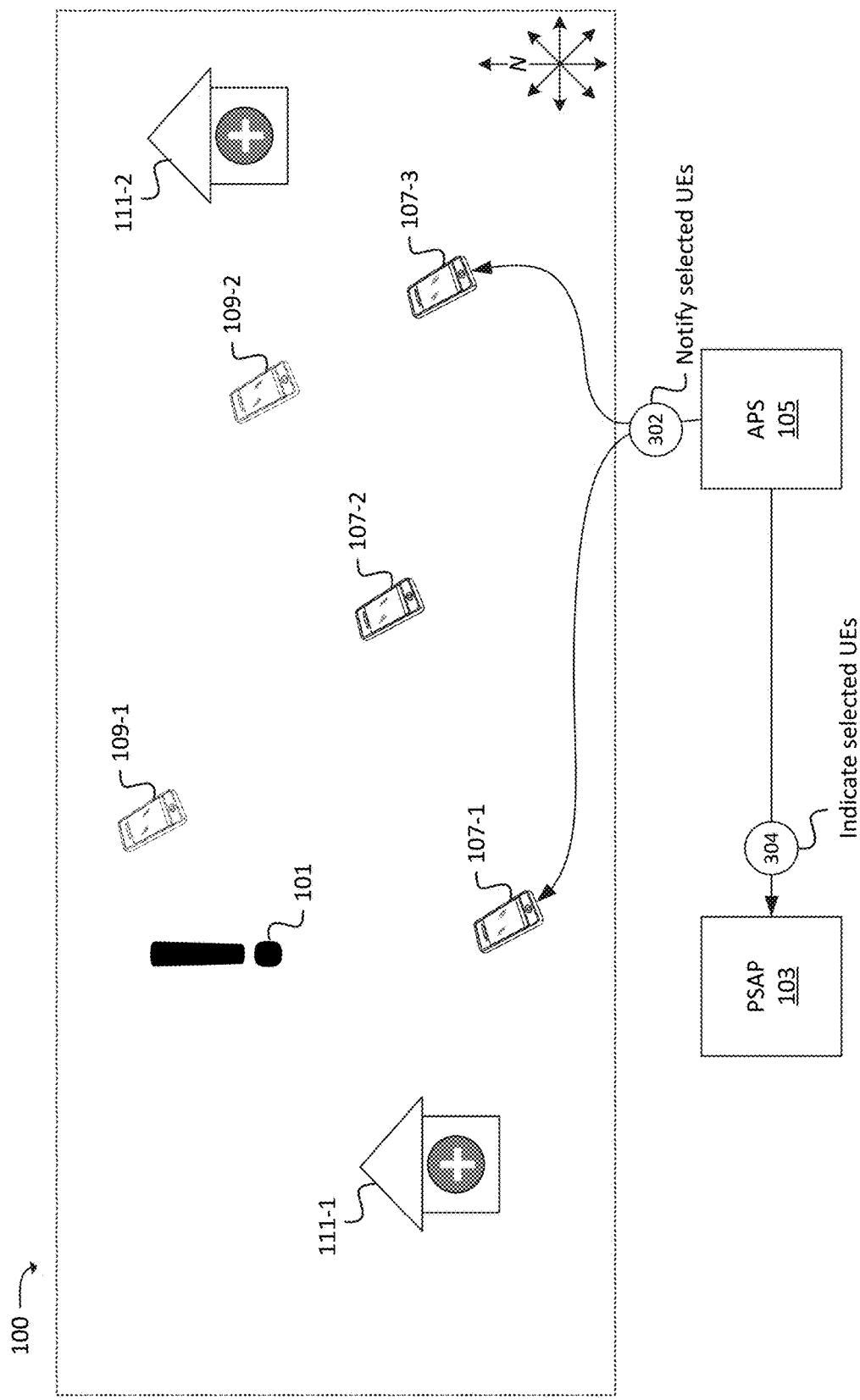
FIG. 3 illustrates an example notification that may be provided to a selected set of UEs based on the detection of an event, in accordance with some embodiments.

As noted above, APS 105 may perform one or more suitable actions based on the selection of UEs 107. For example, as shown in FIG. 3, APS 105 may notify (at 302) selected UEs 107-1 and 107-3 regarding the detected event. For example, APS 105 may forward some or all of the event information (e.g., as received at 104) to UEs 107-1 and 107-3. APS 105 may provide the notifications via a Short Message Service ("SMS") message, a Multimedia Messaging Service ("MMS") message, an email, a pop-up (e.g., system-level) alert, and/or some other suitable type of alert. In some embodiments, APS 105 may obtain or receive contact information (e.g., Mobile Directory Number ("MDN"), Internet Protocol ("IP") address, or the like) from user information repository 205 and/or some other suitable device or system. In some embodiments, APS 105 may notify (at 304) PSAP 103 and/or some other device or system (e.g., facility 111-1, facility 111-2, or some other device, system, facility, etc.) of the selection of UEs 107-1 and 107-3 based on the detected event.

Figure 4:
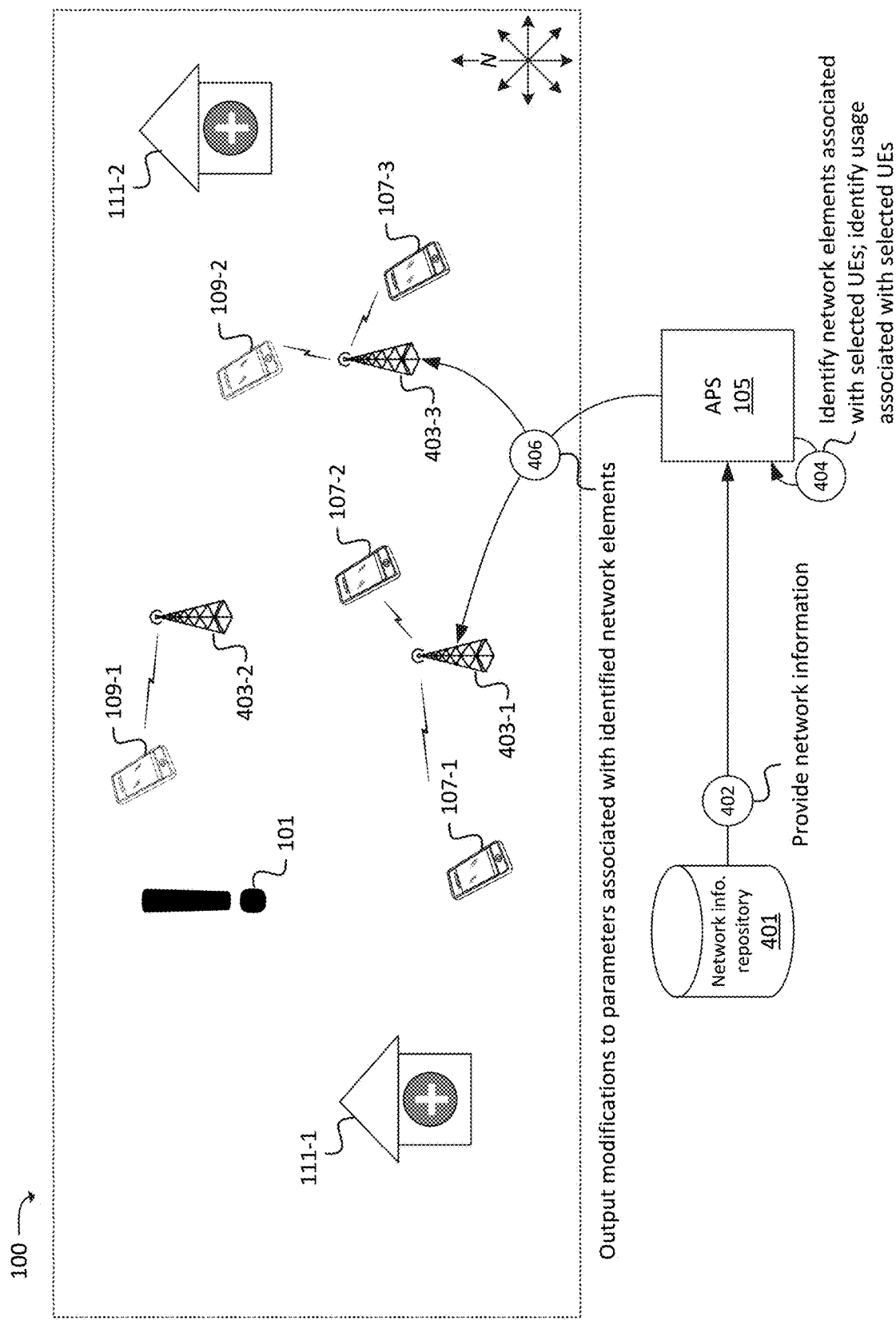
FIGS. 4 and 5 illustrate an example modification to parameters associated with a RAN based on the detection of an event and further based on the selection of one or more UEs associated with the RAN, in accordance with some embodiments.

As another example, and as shown in FIG. 4, APS 105 may effect modifications to one or more RANs providing wireless service to selected UEs 107-1 and 107-3. As discussed above, such modifications may ensure that UEs 107-1 and 107-3 receive wireless service (e.g., are able to wirelessly send and/or receive traffic) according to a particular Quality of Service ("QoS") or priority level, such as a QoS or priority level associated with first responders or other suitable groups or categories. In some embodiments, such QoS or priority levels may be provided via different network "slices," where each network slice is associated with a particular discrete set of network functions or other discrete network resources.

For example, APS 105 may receive (at 402) network information from network information repository 401. In some embodiments, network information repository 401 may be, may include, and/or may be communicatively coupled to a Network Repository Function ("NRF") and/or some other device or system of a wireless network that performs operations related to the maintaining and/or providing of information indicating deployed network elements associated with the wireless network. Such information may include identifiers, IP addresses, location information, usage information, performance metrics, and/or other information associated with base stations and/or other network elements associated with the wireless network.

The received network information may indicate the presence of a set of base stations 403 within geographical region 100, including base stations 403-1, 403-2, and 403-3. As shown, based on the provided network information, APS 105 may identify (at 404) particular network elements associated with the selected UEs 107-1 and 107-3. For example, the provided network information may indicate that UE 107-1 is connected to (e.g., receiving wireless service from) base station 403-1, and that UE 107-3 is connected to base station 403-3. The network information may further indicate that UE 107-2 is connected to base station 403-1, that UE 109-1 is connected to base station 403-2, and that UE 109-2 is connected to base station 403-3.

Based on the selection (e.g., at 204 and 206) of UEs 107-1 and 107-3, and further based on the determination (at 404) that UEs 107-1 and 107-3 are connected to base stations 403-1 and 403-3, respectively, APS 105 may determine that parameters of base stations 403-1 and 403-3 should be modified. One example of such a modification (e.g., the modification of RF resources associated with base stations 403-1 and/or 403-3) is discussed below with respect to FIG. 5. Additionally, or alternatively, APS 105 may determine that one or more parameters associated with UEs 107-1 and/or 107-3 should be modified (e.g., "elevating" or otherwise modifying a priority level, group, category, etc. associated with UEs 107-1 and/or 107-3), as discussed further below with respect to FIG. 6. A modified (e.g., "elevated" or "increased") priority level, category, etc. associated with a given UE 107 based on the detection of an event may allow such UE 107 to receive enhanced or otherwise differentiated wireless service.

Figure 5:
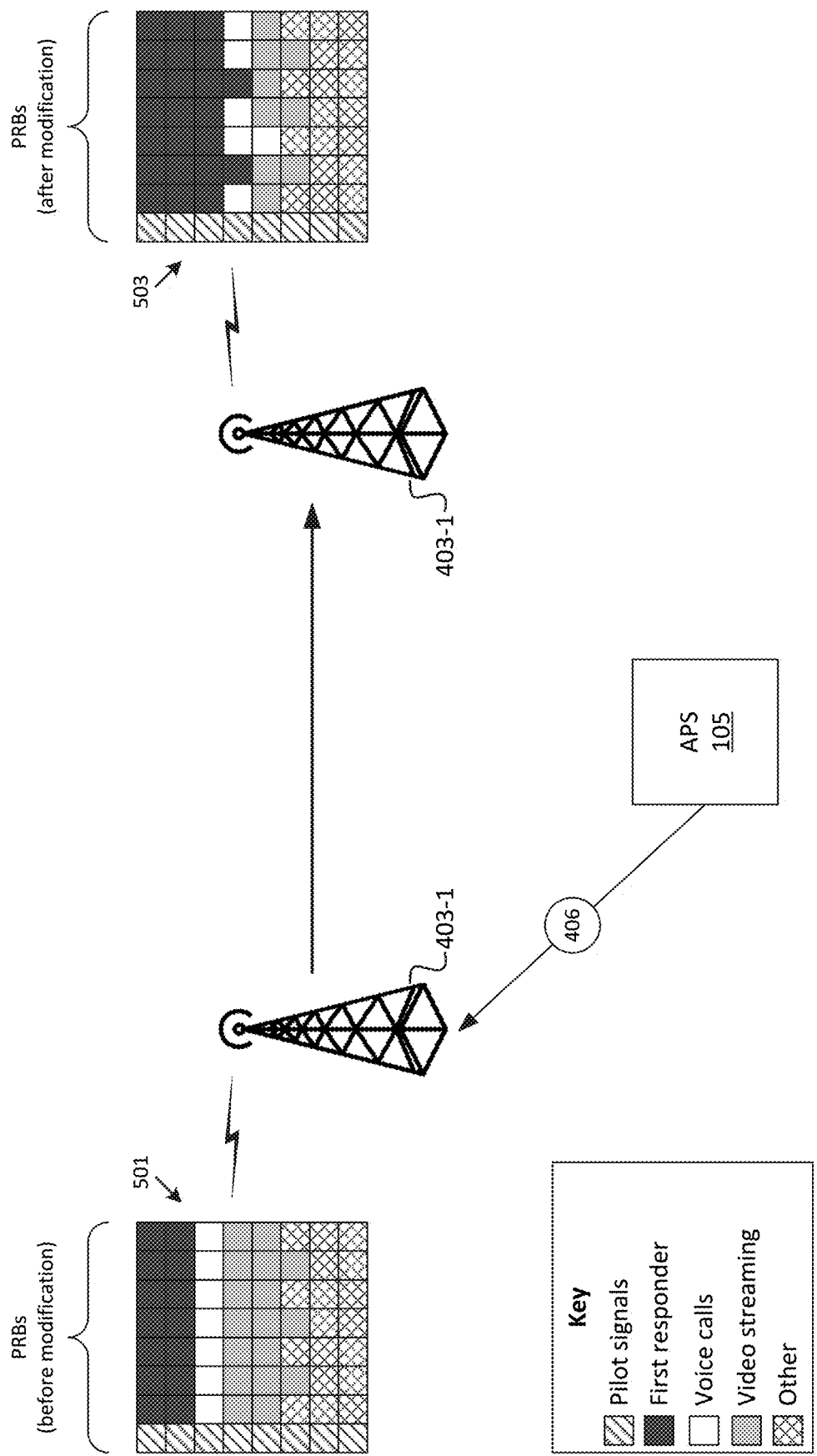

As shown in FIG. 5, for example, prior to the modification (at 406) of parameters associated with base station 403-1, base station 403-1 may be associated with a first set of RF resource configuration parameters 501. RF resource configuration parameters 501 may include allocations, in the time and/or frequency domains, of RF bandwidth associated with base station 403-1. While represented in FIG. 5 as a grid (e.g., where the vertical axis represents the frequency domain and the horizontal axis represents the time domain), such PRBs may be represented differently in practice. Further, the grids of FIG. 5 may represent one frame (or a portion thereof), where a "frame" may refer to a repeating (or otherwise discrete) allocation of PRBs within a given time period. Further, the illustrated PRBs may be PRBs associated with one or more uplink and/or downlink channels, such as a Physical Downlink Control Channel ("PDCCH"), a Physical Downlink Shared Channel ("PDSCH"), a Physical Uplink Control Channel ("PUCCH"), a Physical Uplink Shared Channel ("PUSCH"), and/or some other channel.

The allocations may be associated with different categories, classes, groups, etc., such that base station 403-1 may provide differentiated and/or otherwise discrete RF resources (e.g., PRBs) to such categories, classes, groups, etc. For example, one set of PRBs may be associated with pilot signals transmitted from base station 403-1 (e.g., across all frequencies at a given time slot within the illustrated frame). As further shown, another set of PRBs may be associated with a "first responder" category (e.g., one or more frequencies or frequency bands across multiple time slots within the illustrated frame). Additionally, other sets of PRBs may be associated with a "voice calls" category, a "video streaming" category, and an "other" category (and/or one or more other categories represented here as "other").

The categories may be implemented according to traffic application type (e.g., voice calls, SMS messages, video streaming, etc.), traffic endpoints (e.g., a source and/or destination of traffic, such as a web server, an Internet-accessible resource, a Uniform Resource Locator ("URL"), an IP address, a particular UE 107, etc.), and/or other factors. For example, base station 403-1 may allocate or grant particular resources (e.g., PRBs associated with the "first responder" category) to a particular UE (e.g., a device installed in or associated with a particular facility 111, a personal UE 107, etc.) based on information from user information repository 205, indicating that the particular UE is suitably associated with the "first responder" category. For example, user information repository 205 and/or some other device or system may store information indicating one or more categories, classes, etc. with which particular UEs are associated. One such indication may include a "flag" or other indicator that a particular UE is associated with a "first responder" category. In some embodiments, such indication may include, and/or be based on, a QoS level associated with the particular UE (e.g., a QoS Class Identifier ("QCI"), a QoS Flow Identifier ("QFI"), etc.) and/or with one or more traffic flows associated with the particular UE.

As further shown in FIG. 5, after the modification (at 406) of the parameters associated with base station 403-1, base station 403-1 may allocate RF resources according to a modified second set of RF resource configuration parameters 503. Based on the modified second set of RF resource configuration parameters 503, base station 403-1 may allocate RF resources differently than the allocations according to the first set of RF resource configuration parameters 501. For example, as shown, the amount of resources allocated to the "first responder" category may be increased in the modified second set of RF resource configuration parameters 503 as compared to the first set of RF resource configuration parameters 501. Due to the increase in the RF resources allocated for the "first responder" category, the RF resources allocated for one or more other categories may be reduced (e.g., reduced by an amount equal to or otherwise based on the increased allocation for the "first responder" category).

In some embodiments, APS 105, base station 403-1, and/or some other device or system may determine an amount by which to increase the resources associated with one category and/or by which to reduce the resources associated with another category. As one example, APS 105, base station 403-1, etc. may determine an amount of traffic associated with selected UEs 107, connected to base station 403-1 (e.g., UE 107-1, referring to the examples of previous figures), prior to the modification (at 406). For example, base station 403-1 may have allocated one set of PRBs for voice call traffic to and/or from UE 107-1, and another set of PRBs for video streaming traffic to and/or from UE 107-1. In some embodiments, base station 403-1 may increase the RF resources allocated to the "first responder" traffic by an amount equal to, or otherwise based on, the quantity of PRBs allocated for voice call and video streaming traffic to and/or from UE 107-1. As another example, base station 403-1 may increase the RF resources allocated to the "first responder" category by an amount equal to, or otherwise based on, the quantity of PRBs allocated for voice call traffic to and/or from UE 107-1, but not video streaming traffic to and/or from UE 107-1 (e.g., may selectively increase the PRBs allocated to the "first responder" category based on traffic type or category).

In some embodiments, base station 403-1 may increase the RF resources allocated to the "first responder" category based on a utilization level, load, amount of used and/or available PRBs, etc. associated with the "first responder" category. For example, if the "first responder" category is associated with at least a threshold amount or percentage of available PRBs (e.g., at least 80% of "first responder" PRBs unutilized over a given time frame) prior to the modification (at 406), then base station 403-1 may refrain from increasing the PRBs allocated for the "first responder" category. As another example, if the "first responder" category is associated with at least a threshold amount or percentage of used PRBs (e.g., at least 80% of "first responder" PRBs utilized over a given time frame) prior to the modification (at 406), then base station 403-1 may increase the PRBs allocated for the "first responder" category by a relatively large amount. As yet another example, if the if the "first responder" category is associated with lower than a threshold amount or percentage of used PRBs (e.g., less than 80% of "first responder" PRBs utilized over a given time frame) prior to the modification (at 406), then base station 403-1 may increase the PRBs allocated for the "first responder" category by a relatively smaller amount. In some embodiments, the amount of increased allocation may be on a sliding scale, based on the amount of used and/or unused PRBs for the category.

The amount of reduction of PRB s in other categories may be based on QoS levels associated with the other categories (e.g., where PRBs associated with lower QoS levels may be reduced first), utilization of PRBs associated with other categories (e.g., more heavily utilized categories may be reduced less than less heavily utilized categories), and/or other factors. In this manner, APS 105, base station 403, and/or some other device or system may dynamically increase the resources associated with particular categories of users, UEs, and/or traffic (e.g., the personal UEs 107 associated with first responders, voice calls made via such UEs 107 as opposed to other types of traffic like video streaming, etc.).

Figure 6:
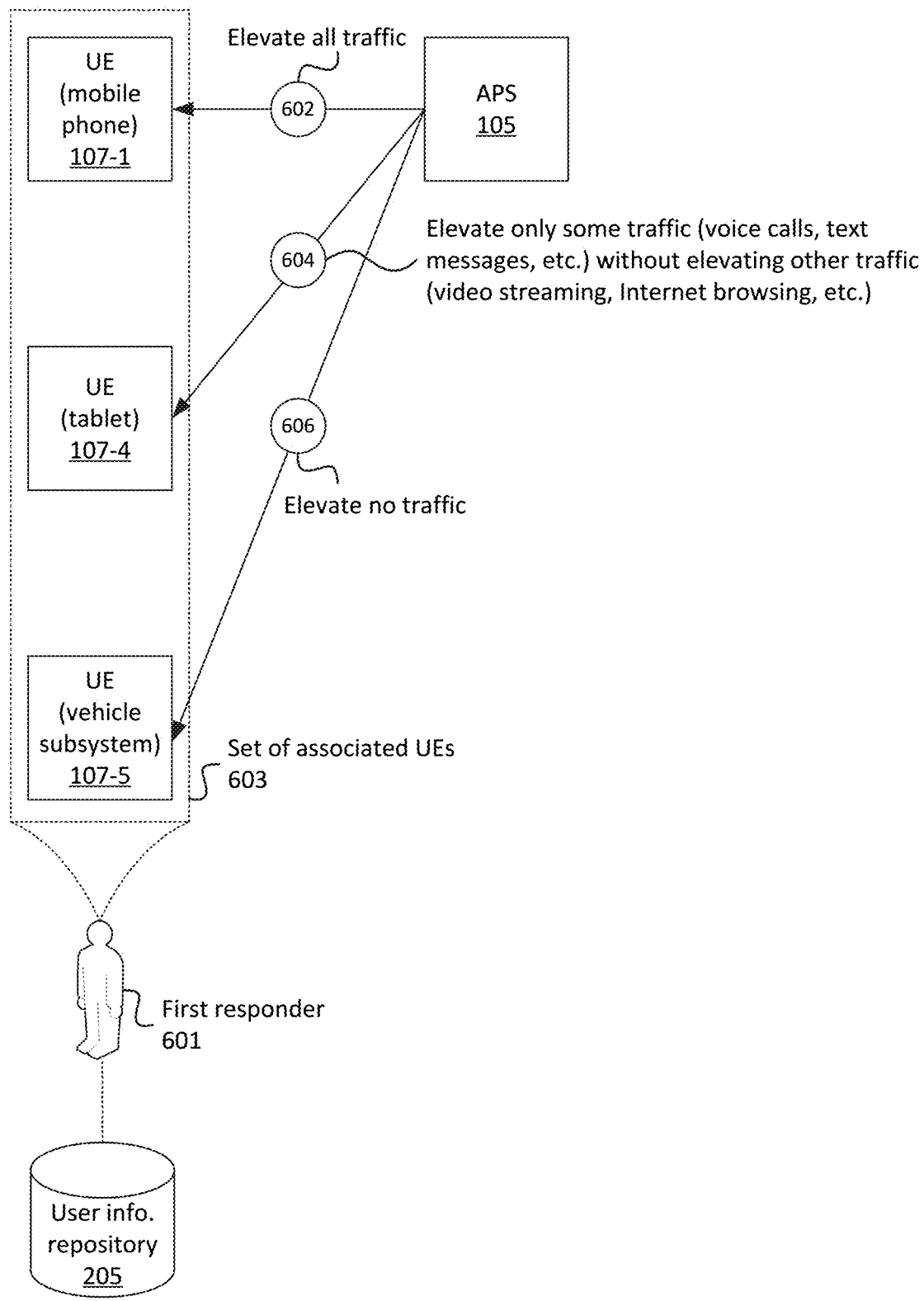
FIG. 6 illustrates an example priority elevation of one or more UEs and/or traffic types based on the detection of an event, in accordance with some embodiments.

As noted above, different types of traffic and/or different traffic endpoints may be treated differently by APS 105 and/or base station 403 (e.g., for the purposes of prioritizing traffic to and/or from UEs 107 based on the detection of an event). As shown in FIG. 6, for example, user information repository 205 may maintain and/or provide (e.g., to APS 105) information associating a particular first responder 601 with a set 603 of UEs 107. The set 603 of UEs 107 may include, for example, a mobile phone (UE 107-1), a tablet device (UE 107-4), and a vehicle subsystem (UE 107-5), which may include an infotainment system, a navigation system, or the like installed or situated in a vehicle. User information repository 205 may further maintain and/or provide information regarding the set 603 of UEs 107, including device type, make and/or model, screen size, and/or other attributes.

Based on the device attributes of UEs 107, APS 105 may determine whether to elevate (e.g., as similarly described above with respect to operations 204 and/or 206) a given UE 107, and/or whether to elevate particular traffic associated with UE 107. For example, APS 105, user information repository 205, PSAP 103, and/or some other device or system may maintain information indicating that a particular UE 107 (and/or certain traffic types associated with UE 107) is "elevated" based on the detection of an event, where an elevated priority level, category, etc. is different from a priority level, category, etc. associated with UE 107 prior to the detection of the event. Based on the "elevated" priority level, UE 107 may be associated with a "first responder" category (e.g., as discussed above with respect to FIG. 5), where such UE 107 may not have been associated with the "first responder" category prior to the elevation of UE 107.

As noted above, APS 105 may elevate UE 107 based on a device type associated with UE 107. In the example of FIG. 5, APS 105 may elevate (at 602) all traffic to and/or from UE 107-1. For example, APS 105 may be configured to determine that all traffic associated with the personal mobile phones of a given set of first responders should be elevated to a "first responder" category based on satisfaction of the predetermined criteria. Additionally, APS 105 may elevate (at 604) some, but not all, traffic associated with UE 107-4. For example, APS 105 may be configured to elevate voice call traffic and text messaging traffic associated with tablet devices should be elevated, but not video streaming traffic or Internet browsing traffic, or any combination thereof. Additionally, or alternatively, APS 105 may elevate such traffic differently. For example, Internet browsing traffic may be elevated to a different (e.g., higher priority) category than a category previously associated with the Internet browsing traffic, and different than the "first responder" category. As further shown, APS 105 may refrain from elevating (at 606) any traffic to and/or from UE 107-5. For example, APS 105 may be configured to not elevate any traffic to and/or from vehicle subsystems.

While FIG. 6 provides an example with respect to one example first responder 601, in practice, similar concepts may apply for multiple first responders. Further, different policies, rules, etc. may be implemented for different first responders, different groups of first responders, different facilities 111, or the like. For example, in some embodiments, APS 105 may be configured to elevate some or all traffic associated with a vehicle subsystem of a different first responder.

The elevating of some or all traffic (e.g., at 602 and/or 604) associated with a given UE 107 based on the detection of the event may allow, cause, facilitate, etc. base station 403 to handle, prioritize, etc. such traffic according to priority categories, classes, etc. Additionally, based on the elevating of traffic associated with particular UEs 107 and further based on the dynamic allocation of RF resources (e.g., allocating more PRB s to a category corresponding to elevated traffic), relevant event-based traffic may be more robustly and reliably handled by a wireless network.

In some embodiments, one or more the operations described above may be reverted after some time. The reverting may include, for example, reverting modified RF resource configuration parameters 503 associated with a given base station 403 to a pervious set of RF resource configuration parameters 501. In some embodiments, the reverting may include de-elevating traffic and/or UEs 107 (e.g., to a category associated with such traffic and/or UEs 107 prior to the elevating). For example, APS 105 may receive an indication that the event has been resolved and/or has otherwise ended, and may revert the operations based on such indication. In some embodiments, APS 105 may revert the operations after a predetermined duration of time has elapsed after such operations have been performed (e.g., 30 minutes, one hour, one day, etc.). In some embodiments, APS 105 may revert the operations on some other basis and/or based on one or more other factors.

Figure 7:
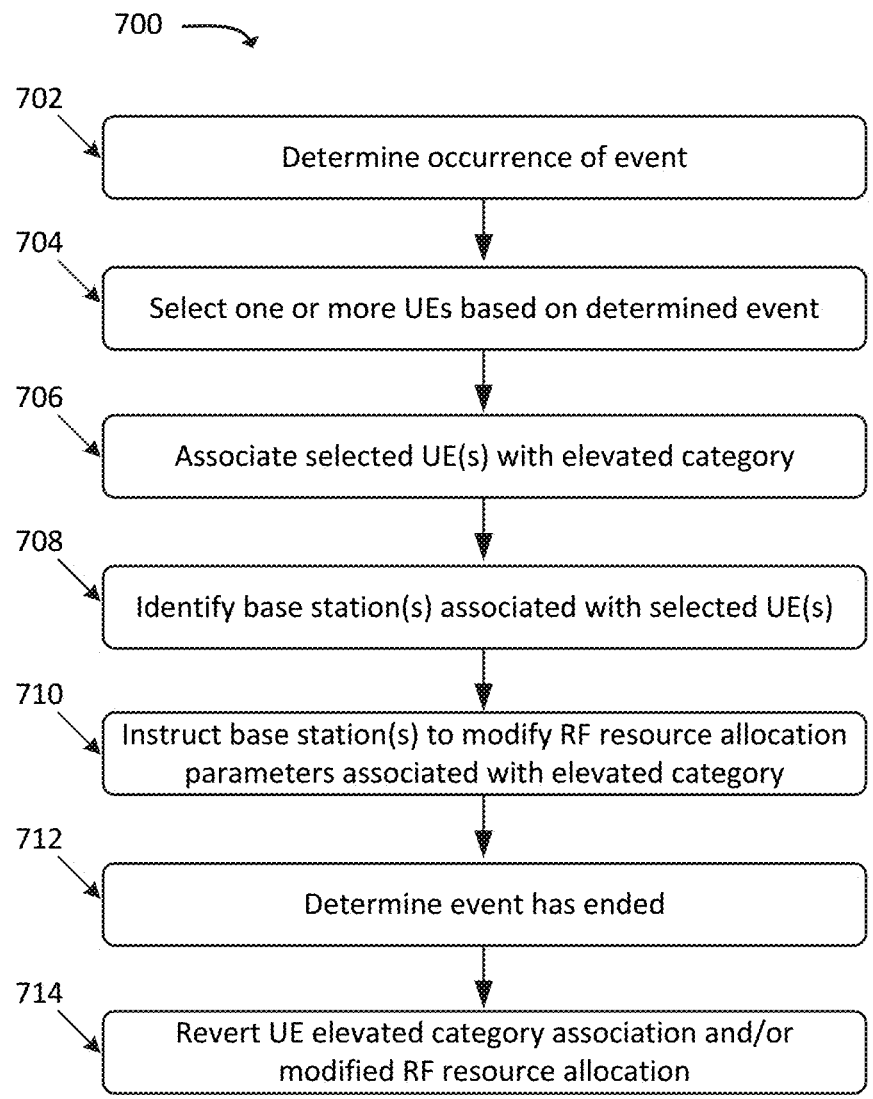
FIG. 7 illustrates an example process for providing elevated and/or prioritized service to a given set of UEs based on the detection of an event, in accordance with some embodiments.

FIG. 7 illustrates an example process 700 for providing elevated and/or prioritized service to a given set of UEs 107 based on the detection of an event. In some embodiments, some or all of process 700 may be performed by APS 105. In some embodiments, one or more other devices may perform some or all of process 700 in concert with, and/or in lieu of, APS 105.

As shown, process 700 may include determining (at 702) the occurrence of an event. For example, as discussed above with respect to FIG. 1, APS 105 may receive an indication of the occurrence of the event from PSAP 103 and/or from some other source.

Process 700 may further include selecting (at 704) one or more UEs 107 based on the determined event. For example, as discussed above with respect to FIG. 2, APS 105 may select one or more UEs 107 based on relevance of such UEs 107 to a location associated with the event, relevance of "home" facilities 111 associated with such UEs 107 to the location associated with the event, and/or other factors. As noted, "relevance" may be determined based on proximity, equipment and/or personnel type, event type, and/or other factors. In some embodiments, UEs not selected (at 704) may be UEs that are not associated with a particular group of UEs or users, such as UEs not associated with first responders or another group.

Process 700 may additionally include associating (at 706) the selected UEs 107 with an elevated category. For example, as discussed above with respect to FIG. 6, APS 105 may selectively associate one or more of the selected UEs 107 (and/or UEs 107 associated with a given user, such as first responder 601) with the elevated category. Further, the elevating may be based on a device type, traffic type, and/or other factors. In some embodiments, associating UEs 107 may include outputting a notification or instruction to user information repository 205 for updating, base station 403, and/or some other device or system, that UEs 107 (and/or selected traffic types associated with UE 107) are associated with the elevated category.

Process 700 may also include identifying (at 708) one or more base stations 403 to modify a RF resource allocation associated with the elevated category. For example, as discussed above with respect to FIG. 4, APS 105 may identify one or more base stations 403 to which the selected UEs 107 are connected, and may instruct such base stations 403 to modify RF resource allocation parameters (e.g., to generated modified RF resource allocation parameters 503). In some embodiments, APS 105 may instruct one or more base stations 403, that are not connected to UEs 107, to modify RF resource allocation parameters. For example, APS 105 may instruct base stations 403 that are "neighbors" (e.g., within a threshold proximity) of a base station 403, to which UE 107 is connected, to modify RF resource allocation parameters. In some embodiments, APS 105 may instruct a particular base station 403 that is within a particular proximity of selected UEs 107 (but to which such UEs 107 are not connected) to modify RF resource allocation parameters. In this manner, UEs 107 that move into coverage areas associated with such base stations 403 may continue to receive service according to the modified RF resource allocation parameters, even when being handed over between multiple base stations 403.

Process 700 may further include instructing (at 710) the identified base stations 403 to modify RF resource allocation parameters associated with the elevated category. For example, as discussed above with respect to FIG. 5, APS 105 may instruct base station 403 to increase a quantity of PRBs allocated for the elevated category. As discussed above, the amount of increase may be equal to or otherwise based on a current usage associated with UEs 107.

Process 700 may additionally include determining (at 712) that the event has ended. For example, APS 105 may receive such information from PSAP 103 or some other source, and/or may determine that at least a threshold amount of time has elapsed since the occurrence of the event was determined (at 702).

Process 700 may also include reverting (at 714) the association of UEs 107 with the elevated category, and/or modification of the RF resource allocation parameters. In some embodiments, removing the association of UEs 107 with the elevated category may include outputting a notification or instruction to user information repository 205, base station 403, and/or some other device or system, that UEs 107 (and/or selected traffic types associated with UEs 107) are no longer associated with the elevated category. In this manner, the association of UEs 107 may be "temporary" based on the occurrence of particular events.

Figure 8:
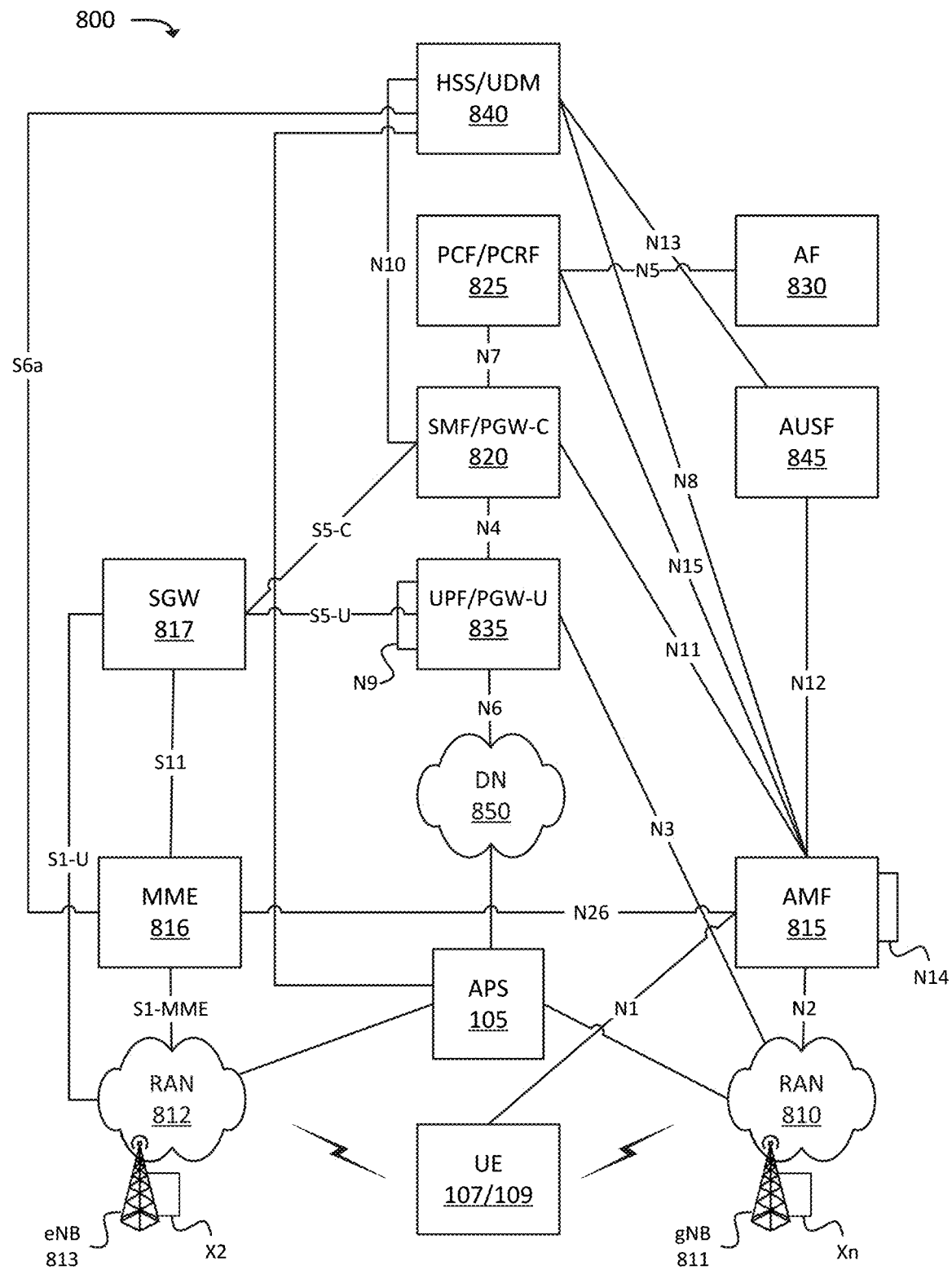
FIG. 8 illustrates an example environment in which one or more embodiments, described herein, may be implemented.

FIG. 8 illustrates an example environment 800, in which one or more embodiments may be implemented. In some embodiments, environment 800 may correspond to a Fifth Generation ("5G") network, and/or may include elements of a 5G network. In some embodiments, environment 800 may correspond to a 5G Non-Standalone ("NSA") architecture, in which a 5G radio access technology ("RAT") may be used in conjunction with one or more other RATs (e.g., a Long-Term Evolution ("LTE") RAT), and/or in which elements of a 5G core network may be implemented by, may be communicatively coupled with, and/or may include elements of another type of core network (e.g., an evolved packet core ("EPC")). As shown, environment 800 may include UE 107 and/or 109 (referred to herein as "UE 107/109"), RAN 810 (which may include one or more Next Generation Node Bs ("gNB s") 811), RAN 812 (which may include one or more one or more evolved Node Bs ("eNBs") 813), and various network functions such as Access and Mobility Management Function ("AMF") 815, Mobility Management Entity ("MME") 816, Serving Gateway ("SGW") 817, Session Management Function ("SMF")/Packet Data Network ("PDN") Gateway ("PGW")-Control plane function ("PGW-C") 820, Policy Control Function ("PCF")/Policy Charging and Rules Function ("PCRF") 825, Application Function ("AF") 830, User Plane Function ("UPF")/PGW-User plane function ("PGW-U") 835, Home Subscriber Server ("HSS")/Unified Data Management ("UDM") 840, and Authentication Server Function ("AUSF") 845. Environment 800 may also include one or more networks, such as Data Network ("DN") 850. Environment 800 may include one or more additional devices or systems communicatively coupled to one or more networks (e.g., DN 850), such as APS 105.

The example shown in FIG. 8 illustrates one instance of each network component or function (e.g., one instance of SMF/PGW-C 820, PCF/PCRF 825, UPF/PGW-U 835, HSS/UDM 840, and/or 845). In practice, environment 800 may include multiple instances of such components or functions. For example, in some embodiments, environment 800 may include multiple "slices" of a core network, where each slice includes a discrete set of network functions (e.g., one slice may include a first instance of SMF/PGW-C 820, PCF/PCRF 825, UPF/PGW-U 835, HSS/UDM 840, and/or 845, while another slice may include a second instance of SMF/PGW-C 820, PCF/PCRF 825, UPF/PGW-U 835, HSS/UDM 840, and/or 845). The different slices may provide differentiated levels of service, such as service in accordance with different QoS parameters. In some embodiments, the different "categories" associated with RF resource allocations, as discussed above, may each be associated with a particular slice.

The quantity of devices and/or networks, illustrated in FIG. 8, is provided for explanatory purposes only. In practice, environment 800 may include additional devices and/or networks, fewer devices and/or networks, different devices and/or networks, or differently arranged devices and/or networks than illustrated in FIG. 8. For example, while not shown, environment 800 may include devices that facilitate or enable communication between various components shown in environment 800, such as routers, modems, gateways, switches, hubs, etc. Alternatively, or additionally, one or more of the devices of environment 800 may perform one or more network functions described as being performed by another one or more of the devices of environment 800. Devices of environment 800 may interconnect with each other and/or other devices via wired connections, wireless connections, or a combination of wired and wireless connections. In some implementations, one or more devices of environment 800 may be physically integrated in, and/or may be physically attached to, one or more other devices of environment 800.

UE 107/109 may include a computation and communication device, such as a wireless mobile communication device that is capable of communicating with RAN 810, RAN 812, and/or DN 850. UE 107/109 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an IoT device (e.g., a sensor, a smart home appliance, or the like), a wearable device, an Internet of Things ("IoT") device, a Mobile-to-Mobile ("M2M") device, or another type of mobile computation and communication device. UE 107/109 may send traffic to and/or receive traffic (e.g., user plane traffic) from DN 850 via RAN 810, RAN 812, and/or UPF/PGW-U 835.

RAN 810 may be, or may include, a 5G RAN that includes one or more base stations (e.g., one or more gNBs 811), via which UE 107/109 may communicate with one or more other elements of environment 800. UE 107/109 may communicate with RAN 810 via an air interface (e.g., as provided by gNB 811). For instance, RAN 810 may receive traffic (e.g., voice call traffic, data traffic, messaging traffic, signaling traffic, etc.) from UE 107/109 via the air interface, and may communicate the traffic to UPF/PGW-U 835, and/or one or more other devices or networks. Similarly, RAN 810 may receive traffic intended for UE 107/109 (e.g., from UPF/PGW-U 835, AMF 815, and/or one or more other devices or networks) and may communicate the traffic to UE 107/109 via the air interface. In some embodiments, base station 403 may be, may include, and/or may be implemented by one or more gNBs 811.

RAN 812 may be, or may include, a LTE RAN that includes one or more base stations (e.g., one or more eNBs 813), via which UE 107/109 may communicate with one or more other elements of environment 800. UE 107/109 may communicate with RAN 812 via an air interface (e.g., as provided by eNB 813). For instance, RAN 810 may receive traffic (e.g., voice call traffic, data traffic, messaging traffic, signaling traffic, etc.) from UE 107/109 via the air interface, and may communicate the traffic to UPF/PGW-U 835, and/or one or more other devices or networks. Similarly, RAN 810 may receive traffic intended for UE 107/109 (e.g., from UPF/PGW-U 835, SGW 817, and/or one or more other devices or networks) and may communicate the traffic to UE 107/109 via the air interface. In some embodiments, base station 403 may be, may include, and/or may be implemented by one or more eNBs 813.

AMF 815 may include one or more devices, systems, Virtualized Network Functions ("VNFs"), etc., that perform operations to register UE 107/109 with the 5G network, to establish bearer channels associated with a session with UE 107/109, to hand off UE 107/109 from the 5G network to another network, to hand off UE 107/109 from the other network to the 5G network, manage mobility of UE 107/109 between RANs 810 and/or gNBs 811, and/or to perform other operations. In some embodiments, the 5G network may include multiple AMFs 815, which communicate with each other via the N14 interface (denoted in FIG. 8 by the line marked "N14" originating and terminating at AMF 815).

MME 816 may include one or more devices, systems, VNFs, etc., that perform operations to register UE 107/109 with the EPC, to establish bearer channels associated with a session with UE 107/109, to hand off UE 107/109 from the EPC to another network, to hand off UE 107/109 from another network to the EPC, manage mobility of UE 107/109 between RANs 812 and/or eNBs 813, and/or to perform other operations.

SGW 817 may include one or more devices, systems, VNFs, etc., that aggregate traffic received from one or more eNBs 813 and send the aggregated traffic to an external network or device via UPF/PGW-U 835. Additionally, SGW 817 may aggregate traffic received from one or more UPF/PGW-Us 835 and may send the aggregated traffic to one or more eNBs 813. SGW 817 may operate as an anchor for the user plane during inter-eNB handovers and as an anchor for mobility between different telecommunication networks or RANs (e.g., RANs 810 and 812).

SMF/PGW-C 820 may include one or more devices, systems, VNFs, etc., that gather, process, store, and/or provide information in a manner described herein. SMF/PGW-C 820 may, for example, facilitate in the establishment of communication sessions on behalf of UE 107/109. In some embodiments, the establishment of communications sessions may be performed in accordance with one or more policies provided by PCF/PCRF 825.

PCF/PCRF 825 may include one or more devices, systems, VNFs, etc., that aggregate information to and from the 5G network and/or other sources. PCF/PCRF 825 may receive information regarding policies and/or subscriptions from one or more sources, such as subscriber databases and/or from one or more users (such as, for example, an administrator associated with PCF/PCRF 825).

AF 830 may include one or more devices, systems, VNFs, etc., that receive, store, and/or provide information that may be used in determining parameters (e.g., quality of service parameters, charging parameters, or the like) for certain applications.

UPF/PGW-U 835 may include one or more devices, systems, VNFs, etc., that receive, store, and/or provide data (e.g., user plane data). For example, UPF/PGW-U 835 may receive user plane data (e.g., voice call traffic, data traffic, etc.), destined for UE 107/109, from DN 850, and may forward the user plane data toward UE 107/109 (e.g., via RAN 810, SMF/PGW-C 820, and/or one or more other devices). In some embodiments, multiple UPFs 835 may be deployed (e.g., in different geographical locations), and the delivery of content to UE 107/109 may be coordinated via the N9 interface (e.g., as denoted in FIG. 8 by the line marked "N9" originating and terminating at UPF/PGW-U 835). Similarly, UPF/PGW-U 835 may receive traffic from UE 107/109 (e.g., via RAN 810, SMF/PGW-C 820, and/or one or more other devices), and may forward the traffic toward DN 850. In some embodiments, UPF/PGW-U 835 may communicate (e.g., via the N4 interface) with SMF/PGW-C 820, regarding user plane data processed by UPF/PGW-U 835.

HSS/UDM 840 and AUSF 845 may include one or more devices, systems, VNFs, etc., that manage, update, and/or store, in one or more memory devices associated with AUSF 845 and/or HSS/UDM 840, profile information associated with a subscriber. AUSF 845 and/or HSS/UDM 840 may perform authentication, authorization, and/or accounting operations associated with the subscriber and/or a communication session with UE 107/109. In some embodiments, user information repository 205 may be, may include, and/or may be communicatively coupled to HSS/UDM 840.

DN 850 may include one or more wired and/or wireless networks. For example, DN 850 may include an IP-based PDN, a wide area network ("WAN") such as the Internet, a private enterprise network, and/or one or more other networks. UE 107/109 may communicate, through DN 850, with data servers, other UEs 107/109, and/or to other servers or applications that are coupled to DN 850. DN 850 may be connected to one or more other networks, such as a public switched telephone network ("PSTN"), a public land mobile network ("PLMN"), and/or another network. DN 850 may be connected to one or more devices, such as content providers, applications, web servers, and/or other devices, with which UE 107/109 may communicate.

APS 105 may include one or more devices, systems, VNFs, etc., that perform one or more operations described herein. For example, APS 105 may select UEs 107 based on the occurrence of an event (e.g., based on the locations of UEs 107 relative to the location of the event, based on locations of "home" facilities 111 associated with UEs 107, etc.), may elevate a priority level or category associated with such UEs 107, and/or may modify RAN parameters (e.g., associated with base stations 403) in order to provide additional RF resources to such UEs 107.

Figure 9:
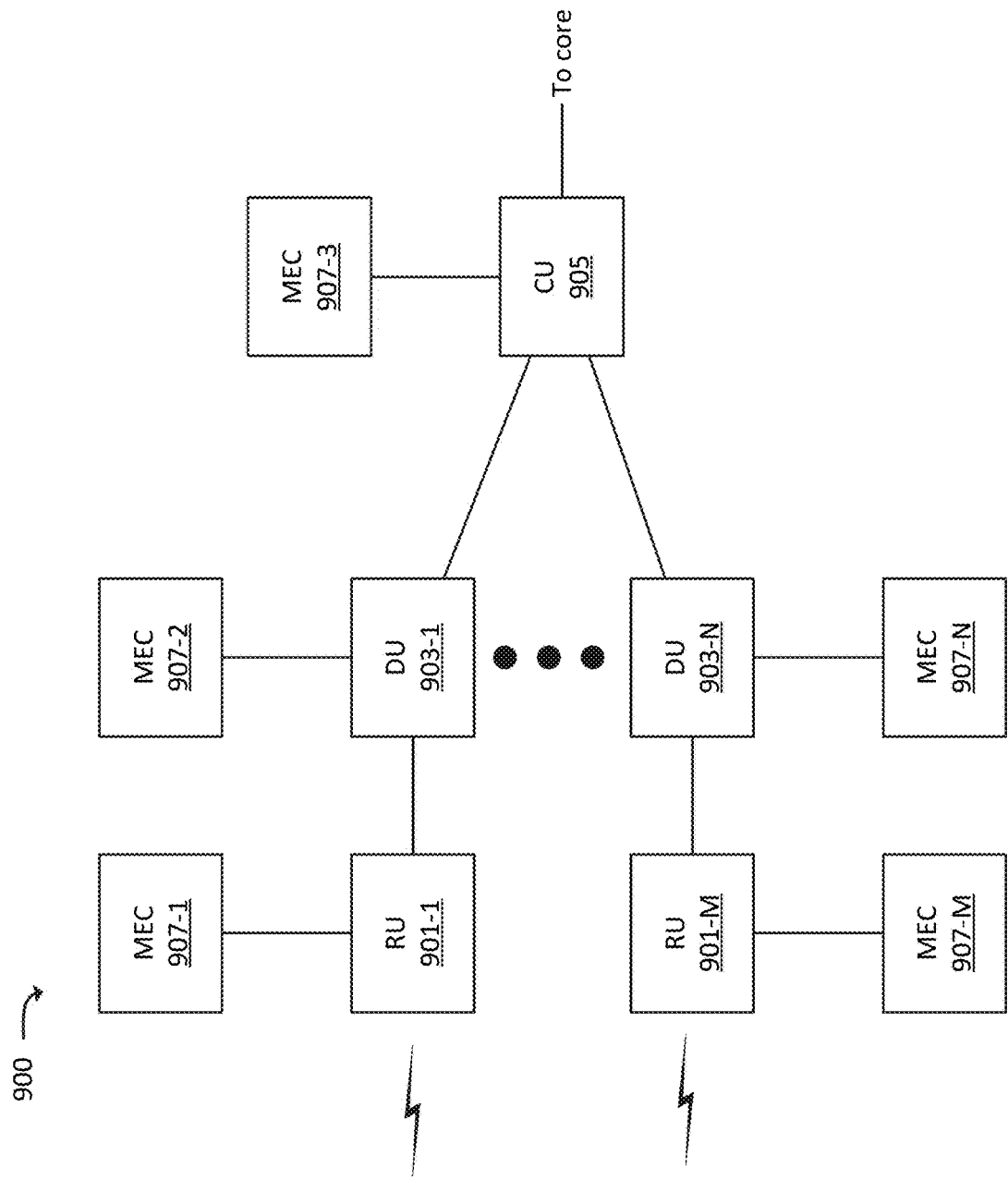
FIG. 9 illustrates an example arrangement of a RAN, in accordance with some embodiments.

FIG. 9 illustrates an example Distributed Unit ("DU") network 900, which may be included in and/or implemented by one or more RANs (e.g., RAN 810, RAN 812, or some other RAN). In some embodiments, a particular RAN may include one DU network 900. In some embodiments, a particular RAN may include multiple DU networks 900. In some embodiments, DU network 900 may correspond to a particular gNB 811 of a 5G RAN (e.g., RAN 810). In some embodiments, DU network 900 may correspond to multiple gNB s 811. In some embodiments, DU network 900 may correspond to one or more other types of base stations of one or more other types of RANs. As shown, DU network 900 may include Central Unit ("CU") 905, one or more Distributed Units ("DUs") 903-1 through 903-N (referred to individually as "DU 903," or collectively as "DUs 903"), and one or more Radio Units ("RUs") 901-1 through 901-M (referred to individually as "RU 901," or collectively as "RUs 901").

CU 905 may communicate with a core of a wireless network (e.g., may communicate with one or more of the devices or systems described above with respect to FIG. 8, such as AMF 815 and/or UPF/PGW-U 835). In the uplink direction (e.g., for traffic from UEs 107/109 to a core network), CU 905 may aggregate traffic from DUs 903, and forward the aggregated traffic to the core network. In some embodiments, CU 905 may receive traffic according to a given protocol (e.g., Radio Link Control ("RLC")) from DUs 903, and may perform higher-layer processing (e.g., may aggregate/process RLC packets and generate Packet Data Convergence Protocol ("PDCP") packets based on the RLC packets) on the traffic received from DUs 903.

In accordance with some embodiments, CU 905 may receive downlink traffic (e.g., traffic from the core network) for a particular UE 107/109, and may determine which DU(s) 903 should receive the downlink traffic. DU 903 may include one or more devices that transmit traffic between a core network (e.g., via CU 905) and UE 107/109 (e.g., via a respective RU 901). DU 903 may, for example, receive traffic from RU 901 at a first layer (e.g., physical ("PHY") layer traffic, or lower PHY layer traffic), and may process/aggregate the traffic to a second layer (e.g., upper PHY and/or RLC). DU 903 may receive traffic from CU 905 at the second layer, may process the traffic to the first layer, and provide the processed traffic to a respective RU 901 for transmission to UE 107/109.

RU 901 may include hardware circuitry (e.g., one or more RF transceivers, antennas, radios, and/or other suitable hardware) to communicate wirelessly (e.g., via an RF interface) with one or more UEs 107/109, one or more other DUs 903 (e.g., via RUs 901 associated with DUs 903), and/or any other suitable type of device. In the uplink direction, RU 901 may receive traffic from UE 107/109 and/or another DU 903 via the RF interface and may provide the traffic to DU 903. In the downlink direction, RU 901 may receive traffic from DU 903, and may provide the traffic to UE 107/109 and/or another DU 903.

RUs 901 may, in some embodiments, be communicatively coupled to one or more Multi-Access/Mobile Edge Computing ("MEC") devices, referred to sometimes herein simply as ("MECs") 907. For example, RU 901-1 may be communicatively coupled to MEC 907-1, RU 901-M may be communicatively coupled to MEC 907-M, DU 903-1 may be communicatively coupled to MEC 907-2, DU 903-N may be communicatively coupled to MEC 907-N, CU 905 may be communicatively coupled to MEC 907-3, and so on. MECs 907 may include hardware resources (e.g., configurable or provisionable hardware resources) that may be configured to provide services and/or otherwise process traffic to and/or from UE 107/109, via a respective RU 901.

For example, RU 901-1 may route some traffic, from UE 107/109, to MEC 907-1 instead of to a core network (e.g., via DU 903 and CU 905). MEC 907-1 may process the traffic, perform one or more computations based on the received traffic, and may provide traffic to UE 107/109 via RU 901-1. In this manner, ultra-low latency services may be provided to UE 107/109, as traffic does not need to traverse DU 903, CU 905, and an intervening backhaul network between DU network 900 and the core network. In some embodiments, MEC 907 may include, and/or may implement, some or all of the functionality described above with respect to APS 105.

Figure 10:
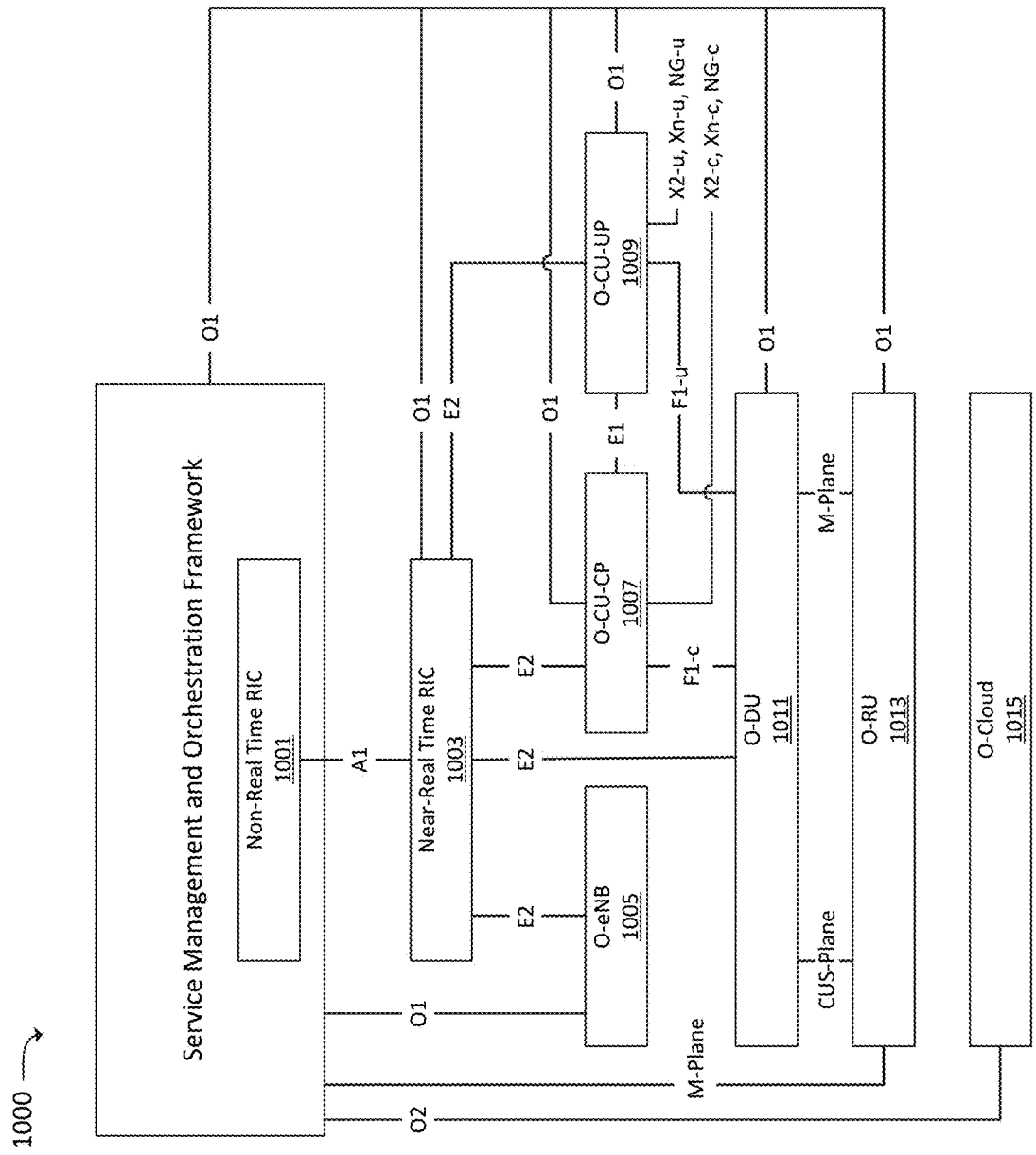
FIG. 10 illustrates an example arrangement of an Open RAN ("O-RAN") environment in which one or more embodiments, described herein, may be implemented.

FIG. 10 illustrates an example O-RAN environment 1000, which may correspond to RAN 810, RAN 812, and/or DU network 900. For example, RAN 810, RAN 812, and/or DU network 900 may include one or more instances of O-RAN environment 1000, and/or one or more instances of O-RAN environment 1000 may implement RAN 810, RAN 812, DU network 900, and/or some portion thereof. As shown, O-RAN environment 1000 may include Non-Real Time Radio Intelligent Controller ("RIC") 1001, Near-Real Time RIC 1003, O-eNB 1005, O-CU-Control Plane ("O-CU-CP") 1007, O-CU-User Plane ("O-CU-UP") 1009, O-DU 1011, O-RU 1013, and O-Cloud 1015. In some embodiments, O-RAN environment 1000 may include additional, fewer, different, and/or differently arranged components.

In some embodiments, some or all of the elements of O-RAN environment 1000 may be implemented by one or more configurable or provisionable resources, such as virtual machines, cloud computing systems, physical servers, and/or other types of configurable or provisionable resources. In some embodiments, some or all of O-RAN environment 1000 may be implemented by, and/or communicatively coupled to, one or more MECs 907.

Non-Real Time RIC 1001 and Near-Real Time RIC 1003 may receive performance information (and/or other types of information) from one or more sources, and may configure other elements of O-RAN environment 1000 based on such performance or other information. For example, Near-Real Time RIC 1003 may receive performance information, via one or more E2 interfaces, from O-eNB 1005, O-CU-CP 1007, and/or O-CU-UP 1009, and may modify parameters associated with O-eNB 1005, O-CU-CP 1007, and/or O-CU-UP 1009 based on such performance information. Similarly, Non-Real Time RIC 1001 may receive performance information associated with O-eNB 1005, O-CU-CP 1007, O-CU-UP 1009, and/or one or more other elements of O-RAN environment 1000 and may utilize machine learning and/or other higher level computing or processing to determine modifications to the configuration of O-eNB 1005, O-CU-CP 1007, O-CU-UP 1009, and/or other elements of O-RAN environment 1000. In some embodiments, Non-Real Time RIC 1001 may generate machine learning models based on performance information associated with O-RAN environment 1000 or other sources, and may provide such models to Near-Real Time RIC 1003 for implementation.

O-eNB 1005 may perform functions similar to those described above with respect to eNB 813. For example, O-eNB 1005 may facilitate wireless communications between UE 107/109 and a core network. O-CU-CP 1007 may perform control plane signaling to coordinate the aggregation and/or distribution of traffic via one or more DUs 903, which may include and/or be implemented by one or more O-DUs 1011, and O-CU-UP 1009 may perform the aggregation and/or distribution of traffic via such DUs 903 (e.g., O-DUs 1011). O-DU 1011 may be communicatively coupled to one or more RUs 901, which may include and/or may be implemented by one or more O-RUs 1013. In some embodiments, O-Cloud 1015 may include or be implemented by one or more MECs 907, which may provide services, and may be communicatively coupled, to O-CU-CP 1007, O-CU-UP 1009, O-DU 1011, and/or O-RU 1013 (e.g., via an O1 and/or O2 interface).

Figure 11:
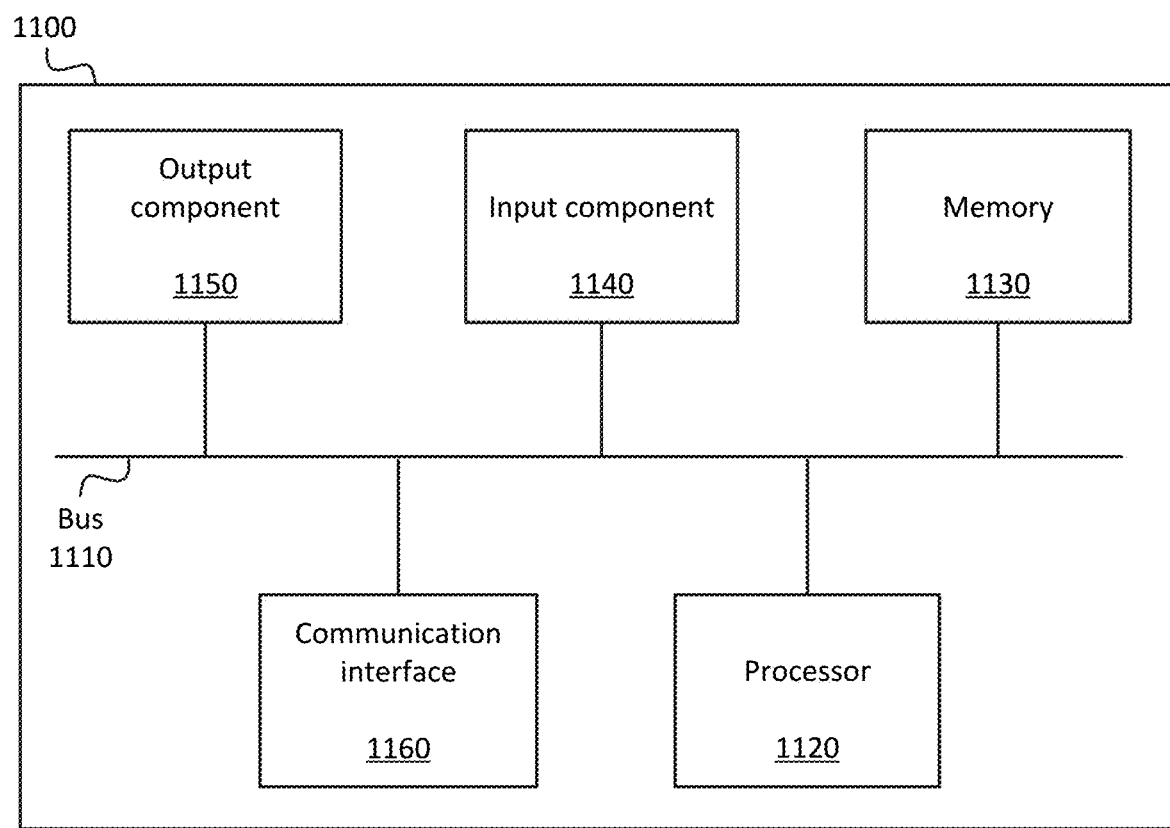
FIG. 11 illustrates example components of one or more devices, in accordance with one or more embodiments described herein.

FIG. 11 illustrates example components of device 1100. One or more of the devices described above may include one or more devices 1100. Device 1100 may include bus 1110, processor 1120, memory 1130, input component 1140, output component 1150, and communication interface 1160. In another implementation, device 1100 may include additional, fewer, different, or differently arranged components.

Bus 1110 may include one or more communication paths that permit communication among the components of device 1100. Processor 1120 may include a processor, microprocessor, or processing logic that may interpret and execute instructions. Memory 1130 may include any type of dynamic storage device that may store information and instructions for execution by processor 1120, and/or any type of non-volatile storage device that may store information for use by processor 1120.

Input component 1140 may include a mechanism that permits an operator to input information to device 1100 and/or other receives or detects input from a source external to 1140, such as a touchpad, a touchscreen, a keyboard, a keypad, a button, a switch, a microphone or other audio input component, etc. In some embodiments, input component 1140 may include, or may be communicatively coupled to, one or more sensors, such as a motion sensor (e.g., which may be or may include a gyroscope, accelerometer, or the like), a location sensor (e.g., a Global Positioning System ("GPS")-based location sensor or some other suitable type of location sensor or location determination component), a thermometer, a barometer, and/or some other type of sensor. Output component 1150 may include a mechanism that outputs information to the operator, such as a display, a speaker, one or more light emitting diodes ("LEDs"), etc.

Communication interface 1160 may include any transceiver-like mechanism that enables device 1100 to communicate with other devices and/or systems. For example, communication interface 1160 may include an Ethernet interface, an optical interface, a coaxial interface, or the like. Communication interface 1160 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 1100 may include more than one communication interface 1160. For instance, device 1100 may include an optical interface and an Ethernet interface.

Device 1100 may perform certain operations relating to one or more processes described above. Device 1100 may perform these operations in response to processor 1120 executing software instructions stored in a computer-readable medium, such as memory 1130. A computer-readable medium may be defined as a non-transitory memory device. A memory device may include space within a single physical memory device or spread across multiple physical memory devices. The software instructions may be read into memory 1130 from another computer-readable medium or from another device. The software instructions stored in memory 1130 may cause processor 1120 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described above (e.g., with regard to FIGS. 1-7), the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information of individuals, groups or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various access control, encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:
   one or more processors configured to:
   identify a first User Equipment ("UE") that is associated with a first home facility that is associated with a first geographical location;
   identify a second UE that is associated with a second home facility that is associated with a second geographical location;
   determine an occurrence of a particular event associated with a third geographical location;
   associate, based on the first geographical location with which the first home facility is associated and further based on the third geographical location with which the event is associated, the first UE with a particular category;
   associate, based on a geographical location with which the second UE is associated and further based on the third geographical location with which the event is associated, the second UE with the particular category; and
   instruct, based on determining the occurrence of the event, a radio access network ("RAN") to modify a radio frequency ("RF") resource allocation associated with the particular category, wherein the first and second UEs receive wireless service via the RAN according to the modified RF resource allocation based on being associated with the particular category.

2. The device of claim 1, wherein associating the first UE with the particular category includes:
   identifying that the first home facility, with which the first UE is associated, is within a threshold proximity of the event.

3. The device of claim 2, wherein associating the first UE with the particular category further includes:
   identifying that a geographical location of the first UE is not within the threshold proximity of the event.

4. The device of claim 1, wherein associating the second UE with the particular category includes:
   identifying that the second home facility, with which the second UE is associated, is not within a threshold proximity of the event.

5. The device of claim 3, wherein associating the second UE with the particular category further includes:
   identifying that a geographical location of the second UE is within the threshold proximity of the event.

6. The device of claim 1, wherein the one or more processors are further configured to:
   determine, after instructing the RAN to modify the RF resource allocation associated with the particular category, that the particular event has ended, wherein the first and second UEs receive wireless service via the RAN according to an RF resource allocation that was in effect prior to the modification.

7. The device of claim 1, wherein the one or more processors are further configured to:
identify a third UE that is associated with the second home facility;
identify that a geographical location of the third UE is not within a threshold proximity of the third geographical location with which the event is associated; and
forgo associating the third UE with the particular category based on identifying that the geographical location of the third UE is not within the threshold proximity of the third geographical location with which the event is associated.

8. A non-transitory computer-readable medium, storing a plurality of processor-executable instructions to:
identify a first User Equipment ("UE") that is associated with a first home facility that is associated with a first geographical location;
identify a second UE that is associated with a second home facility that is associated with a second geographical location;
determine an occurrence of a particular event associated with a third geographical location;
associate, based on the first geographical location with which the first home facility is associated and further based on the third geographical location with which the event is associated, the first UE with a particular category;
associate, based on a geographical location with which the second UE is associated and further based on the third geographical location with which the event is associated, the second UE with the particular category; and
instruct, based on determining the occurrence of the event, a radio access network ("RAN") to modify a radio frequency ("RF") resource allocation associated with the particular category, wherein the first and second UEs receive wireless service via the RAN according to the modified RF resource allocation based on being associated with the particular category.

9. The non-transitory computer-readable medium of claim 8, wherein associating the first UE with the particular category includes:
identifying that the first home facility, with which the first UE is associated, is within a threshold proximity of the event.

10. The non-transitory computer-readable medium of claim 9, wherein associating the first UE with the particular category further includes:
identifying that a geographical location of the first UE is not within the threshold proximity of the event.

11. The non-transitory computer-readable medium of claim 8, wherein associating the second UE with the particular category includes:
identifying that the second home facility, with which the second UE is associated, is not within a threshold proximity of the event.

12. The non-transitory computer-readable medium of claim 11, wherein associating the second UE with the particular category further includes:
identifying that a geographical location of the second UE is within the threshold proximity of the event.

13. The non-transitory computer-readable medium of claim 8, wherein the plurality of processor-executable instructions further include processor-executable instructions to:
determine, after instructing the RAN to modify the RF resource allocation associated with the particular category, that the particular event has ended,
wherein the first and second UEs receive wireless service via the RAN according to an RF resource allocation that was in effect prior to the modification.

14. The non-transitory computer-readable medium of claim 8, wherein the plurality of processor-executable instructions further include processor-executable instructions to:
identify a third UE that is associated with the second home facility;
identify that a geographical location of the third UE is not within a threshold proximity of the third geographical location with which the event is associated; and
forgo associating the third UE with the particular category based on identifying that the geographical location of the third UE is not within the threshold proximity of the third geographical location with which the event is associated.

15. A method, comprising:
identifying a first User Equipment ("UE") that is associated with a first home facility that is associated with a first geographical location;
identifying a second UE that is associated with a second home facility that is associated with a second geographical location;
determining an occurrence of a particular event associated with a third geographical location;
associating, based on the first geographical location with which the first home facility is associated and further based on the third geographical location with which the event is associated, the first UE with a particular category;
associating, based on a geographical location with which the second UE is associated and further based on the third geographical location with which the event is associated, the second UE with the particular category; and
instructing, based on determining the occurrence of the event, a radio access network ("RAN") to modify a radio frequency ("RF") resource allocation associated with the particular category, wherein the first and second UEs receive wireless service via the RAN according to the modified RF resource allocation based on being associated with the particular category.

16. The method of claim 15, wherein associating the first UE with the particular category includes:
identifying that the first home facility, with which the first UE is associated, is within a threshold proximity of the event, wherein associating the first UE with the particular category further includes:
identifying that a geographical location of the first UE is not within the threshold proximity of the event.

17. The method of claim 15, wherein associating the second UE with the particular category includes:
identifying that the second home facility, with which the second UE is associated, is not within a threshold proximity of the event.

18. The method of claim 17, wherein associating the second UE with the particular category further includes:
identifying that a geographical location of the second UE is within the threshold proximity of the event.

19. The method of claim 15, further comprising:
determining, after instructing the RAN to modify the RF resource allocation associated with the particular category, that the particular event has ended,
wherein the first and second UEs receive wireless service via the RAN according to an RF resource allocation that was in effect prior to the modification.

20. The method of claim 15, further comprising:
identifying a third UE that is associated with the second home facility;
identifying that a geographical location of the third UE is not within a threshold proximity of the third geographical location with which the event is associated; and
forgoing associating the third UE with the particular category based on identifying that the geographical location of the third UE is not within the threshold proximity of the third geographical location with which the event is associated.

* * * * *